United States Patent
Binek et al.

(10) Patent No.: US 11,359,543 B2
(45) Date of Patent: Jun. 14, 2022

(54) ATTRITABLE ENGINE ADDITIVELY MANUFACTURED INLET CAP

(71) Applicant: United Technologies Corporation, Farmington, CT (US)

(72) Inventors: Lawrence A. Binek, Glastonbury, CT (US); Jesse R. Boyer, Middletown, CT (US); Evan J. Butcher, Suffield, CT (US); Michael Winter, New Haven, CT (US); Jesus A. Garcia, San Diego, CA (US); Sean R. Jackson, Palm City, FL (US)

(73) Assignee: Raytheon Technologies Corporation, Farmington, CT (US)

(*) Notice: Subject to any disclaimer, the term of this patent is extended or adjusted under 35 U.S.C. 154(b) by 363 days.

(21) Appl. No.: 16/434,453

(22) Filed: Jun. 7, 2019

(65) Prior Publication Data
US 2020/0386160 A1    Dec. 10, 2020

(51) Int. Cl.
*F02C 7/055*    (2006.01)

(52) U.S. Cl.
CPC .......... *F02C 7/055* (2013.01); *F05D 2230/31* (2013.01); *F05D 2260/607* (2013.01)

(58) Field of Classification Search
CPC .... F02C 7/055; B64C 11/14; F05D 2260/607; F05D 2230/31
See application file for complete search history.

(56) References Cited

U.S. PATENT DOCUMENTS

| | | | | |
|---|---|---|---|---|
| 4,379,191 A | * | 4/1983 | Beggs | B32B 3/12 181/292 |
| 4,743,740 A | * | 5/1988 | Adee | B64D 15/00 156/273.9 |
| 6,527,829 B1 | * | 3/2003 | Malkamaki | B03C 3/017 95/71 |
| 11,047,305 B2 | * | 6/2021 | Fraser-Beekman | F02C 7/055 |
| 2007/0028589 A1 | * | 2/2007 | Alexander | F01D 15/10 60/39.08 |
| 2009/0214331 A1 | * | 8/2009 | Jewess | F01D 5/023 415/198.1 |
| 2011/0290116 A1 | * | 12/2011 | Jarrier | B01D 46/0013 95/280 |
| 2014/0255202 A1 | | 9/2014 | Kling et al. | |
| 2016/0108813 A1 | * | 4/2016 | Schmitz | B23P 15/26 60/39.511 |
| 2017/0009656 A1 | | 1/2017 | Vessot et al. | |
| 2017/0268424 A1 | * | 9/2017 | Grissino | F04D 29/522 |
| 2017/0334571 A1 | * | 11/2017 | Bai | B64D 33/02 |
| 2018/0215478 A1 | * | 8/2018 | Iglewski | F02C 7/055 |

(Continued)

OTHER PUBLICATIONS

European Search Report dated Sep. 22, 2020 for European Patent Application No. 20175922.2.

*Primary Examiner* — Todd E Manahan
*Assistant Examiner* — Rodolphe Andre Chabreyrie
(74) *Attorney, Agent, or Firm* — Bachman & LaPointe, P.C.

(57) ABSTRACT

A turbine engine has: a compressor; a combustor; a turbine, a gas flowpath passing consecutively through the compressor, combustor, and turbine; and inlet member along the gas flowpath upstream of the compressor. The inlet member includes the unitarily-formed single piece combination of: a three dimensional (3D) lattice portion; and a nose cap body surrounding the lattice portion.

21 Claims, 8 Drawing Sheets

(56) References Cited

U.S. PATENT DOCUMENTS

| | | | |
|---|---|---|---|
| 2018/0245514 A1* | 8/2018 | Kyritsis | F02K 3/06 |
| 2019/0048797 A1 | 2/2019 | Slawinska et al. | |
| 2019/0048798 A1* | 2/2019 | Slawinska | B64D 15/04 |
| 2019/0316521 A1* | 10/2019 | Fraser-Beekman | B64D 33/02 |

* cited by examiner

ATTRITABLE ENGINE ADDITIVELY MANUFACTURED INLET CAP

BACKGROUND

The disclosure relates to attritable gas turbine engines. More particularly, the disclosure relates to inlet screens for such engines.

Attritable gas turbine engines are often used in short lifespan applications such as unmanned aerial vehicles (UAV) and ordnance.

A well-known attritable engine is the TJ-150 turbojet engine of United Technologies Corporation, East Hartford, Conn. The TJ-150 engine is a single-spool centrifugal turbojet. The rotor is rearwardly cantilevered, supported by a pair of bearings within an inlet centerbody. The bearings are axially spaced apart with a generator in between.

Due to low life requirements of an attritable engine, there is no separate recirculating oil system as in typical aircraft engine. Rather, the bearings are lubricated via a flow of fuel which exits the bearings and passes into the compressor to supplement the main fuel introduced at the combustor. For additional cooling of the bearings and generator and to drive the fuel from the bearings, an air flow passes through the inlet centerbody. The airflow entrains the fuel and then merges with the main air flow entering the compressor inlet. The centerbody has a nose cap comprising a nose cap body (e.g., a casting or machining) and a for a minute cover in the form of a layered wire mesh insert to the nose cap body extending across a central air passageway. The mesh acts as a debris shield to deflect or trap debris which might damage the bearings or generator.

The nose cap body includes two fuel feed passageways in two arms extending radially inward to a body within the air passageway of the nose cap body. One of the passageways is positioned to feed fuel to the forward bearing. The other is positioned to feed fuel to the aft bearing, bypassing the forward bearing.

Air flow passing through the mesh and around the arms encounters the forward bearing, then the generator, and finally the aft bearing and then passes radially outward to the compressor inlet to merge with the main inlet air flow.

SUMMARY

One aspect of the disclosure involves a turbine engine comprising: a compressor; a combustor; a turbine, a gas flowpath passing consecutively through the compressor, combustor, and turbine; and inlet member along the gas flowpath upstream of the compressor. The inlet member comprises the unitarily-formed single piece combination of: a three dimensional (3D) lattice portion; and a nose cap body surrounding the lattice portion.

A further embodiment of any of the foregoing embodiments may additionally and/or alternatively include the inlet member being formed of steel or AlSi10Mg.

A further embodiment of any of the foregoing embodiments may additionally and/or alternatively include the lattice being a regular lattice.

A further embodiment of any of the foregoing embodiments may additionally and/or alternatively include the lattice being a bi-triangle lattice.

A further embodiment of any of the foregoing embodiments may additionally and/or alternatively include the lattice having a beam length measured node center to node center of 0.3 mm to 5.0 mm.

A further embodiment of any of the foregoing embodiments may additionally and/or alternatively include the lattice having a beam cross-sectional dimension of 0.05 mm to 1.5 mm.

A further embodiment of any of the foregoing embodiments may additionally and/or alternatively include the lattice having a domed forward perimeter portion and a radially outwardly and rearwardly divergent aft perimeter portion.

A further embodiment of any of the foregoing embodiments may additionally and/or alternatively include the aft perimeter portion being conical.

A further embodiment of any of the foregoing embodiments may additionally and/or alternatively include the lattice portion having an axial depth of at least 2.0 mm.

A further embodiment of any of the foregoing embodiments may additionally and/or alternatively include the lattice portion having an axial depth at an axial centerline of less than 75% of an axial depth at a location outboard of the centerline.

A further embodiment of any of the foregoing embodiments may additionally and/or alternatively include the nose cap body comprising a plurality of mounting holes; and a plurality of threaded fasteners mounting the nose cap to an inlet housing.

A further embodiment of any of the foregoing embodiments may additionally and/or alternatively include the engine being a single spool engine.

A further embodiment of any of the foregoing embodiments may additionally and/or alternatively include: the compressor being a centrifugal compressor; and the combustor being a reverse flow combustor.

Another aspect of the disclosure involves a method for manufacturing the turbine engine. The method comprises: additive manufacture of the inlet member; and assembling the inlet member to an inlet housing.

A further embodiment of any of the foregoing embodiments may additionally and/or alternatively include the assembling registers passageways of the nose cap body with passageways of the inlet housing.

A further embodiment of any of the foregoing embodiments may additionally and/or alternatively include the additive manufacture comprises laser powder bed fusion.

Another aspect of the disclosure involves a turbine engine inlet member comprising the unitarily formed single piece combination of: a three dimensional (3D) lattice portion; and a nose cap body surrounding the lattice portion.

A further embodiment of any of the foregoing embodiments may additionally and/or alternatively include the three dimensional lattice portion having a domed forward perimeter portion.

A further embodiment of any of the foregoing embodiments may additionally and/or alternatively include the three dimensional lattice portion having a rearwardly divergent aft perimeter portion.

A further embodiment of any of the foregoing embodiments may additionally and/or alternatively include the aft perimeter portion being conical or frustoconical.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
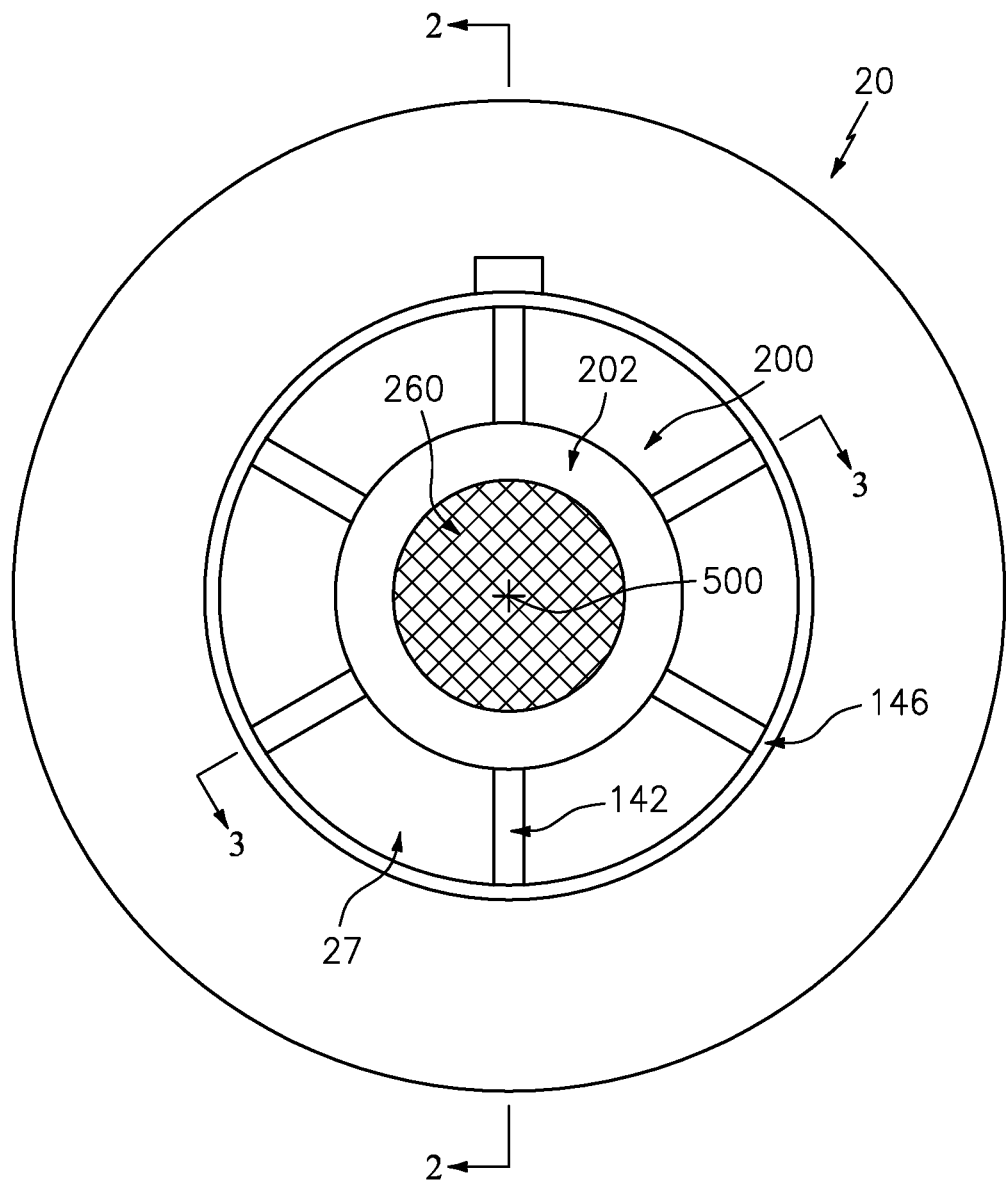
FIG. 1 is a partially schematic front view of an attritable gas turbine engine.

FIG. 1 shows a gas turbine engine 20 based on the aforementioned TJ-150 engine. The key difference is the presence of a unitarily-formed nose cap 200.

The engine has a core centerline 500 (FIG. 2) which serves as an axis of rotation of one or more spools 24 relative to a case 26. As is discussed further below, the exemplary engine is a single-spool attritable turbine engine, namely a turbojet. The case 26 is formed as an axial assembly of multiple pieces (e.g., castings). A primary gas flowpath (gaspath) 502 extends from an inlet 27 to an outlet 28. Along the gaspath 502, the inlet gas flow 504 is an air flow and the outlet (exhaust) flow 506 is an exhaust gas flow. At a front or forward end of the engine (e.g., shown surrounded by the inlet 27) is an inlet centerbody 29.

The exemplary gaspath 502 passes sequentially through a compressor section (compressor) 30, a combustor section 32, and a turbine section 34. The exemplary compressor and turbine sections respectively have a centrifugal impeller 36 and centrifugal turbine 38. The impeller and turbine have respective hubs 40, 42 (FIG. 2A) having gaspath-facing surfaces 44, 46 and a circumferential array of vanes 48, 50 extending radially outward to edges or tips 52, 54 in close facing relation or rubbing relation to inner diameter (ID) surfaces 60, 62 of non-rotating structure forming shrouds. Along the gaspath 502, the respective vanes 48, 50 extend from leading (upstream) ends 70, 72 to trailing (downstream) ends 74, 76.

The exemplary compressor 30 receives a generally axial air flow 504 (FIG. 2) along the gaspath 502 and redirects it partially radially outward. Upon exiting the impeller 36 at the vane downstream ends 74, the air flow is redirected more axially rearward in a diffuser 80. Exiting the diffuser, the air flow enters the combustor 32. The exemplary combustor 32 is a reverse flow annular combustor wherein the air is combusted with fuel (introduced via manifold 90) and diverted back forward to enter the turbine 38 passing radially inward at the turbine vane upstream ends 72. Passing along the turbine 38, the combustion gases are expanded and redirected axially rearward to pass into an exhaust duct 100 and out the outlet 28 as the outlet or exhaust flow 506.

The exemplary spool 24 (FIG. 2A) extends from a front or forward end 120 to a rear or aft end 122. The impeller 36 and turbine 38 are rearwardly cantilevered with the spool 24 supported by a pair of bearings 130, 132 along a forward portion of a spool shaft 134. The exemplary spool shaft 134 is unitarily formed with the turbine 38 with an intermediate portion of the spool shaft received in a bore of the impeller 36 (e.g., via splined or otherwise rotationally keyed inter-fitting).

The exemplary bearings 130 and 132 have ball bearing arrays with respective inner races on the spool shaft 134 and outer races mounted to the case 26. At the inlet 27, the case 26 includes an inlet member (e.g., a casting) 140 having a circumferential array of vanes 142 extending radially from an inner diameter hub 144 to an outer diameter case portion 146. The exemplary hub 144 forms a portion of the outer diameter contour of the centerbody 29 and mounts the outer races of bearings 130 and 132.

Figure 2:
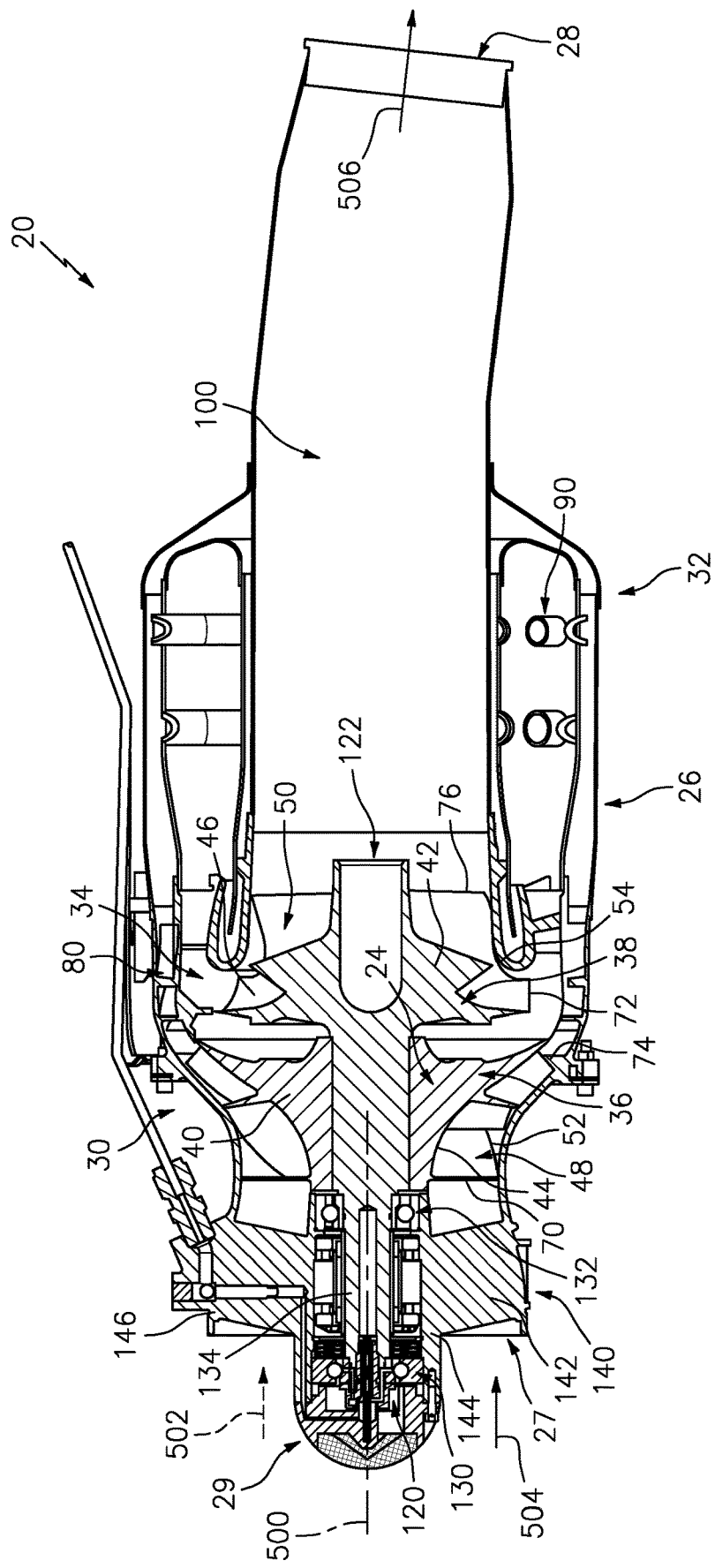
FIG. 2 is a partially schematic axial sectional view of the engine of FIG. 1 taken along line 2-2.
Figure 2A:
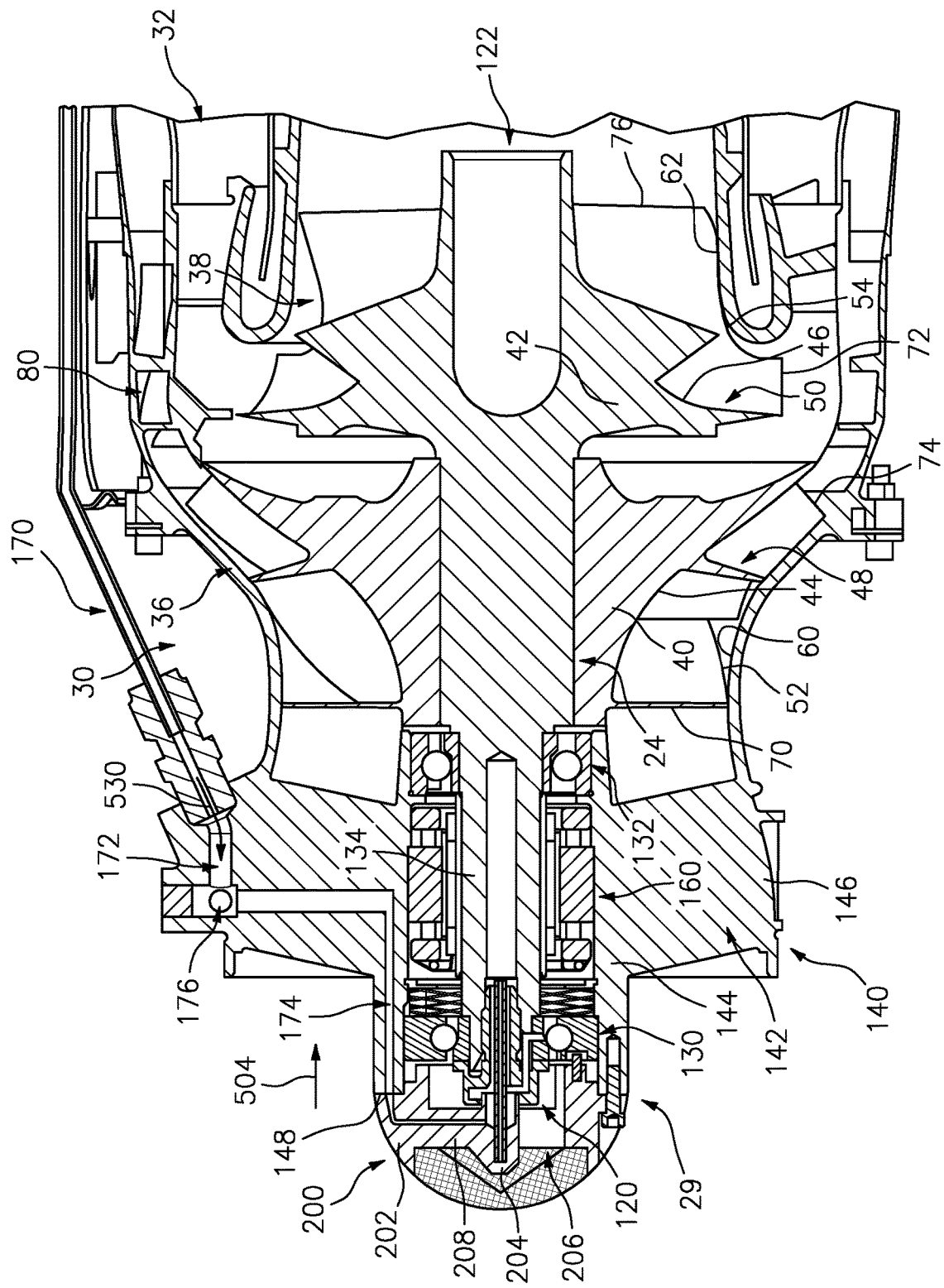
FIG. 2A is an enlarged view of a forward portion of the engine of FIG. 2.
Figure 2B:
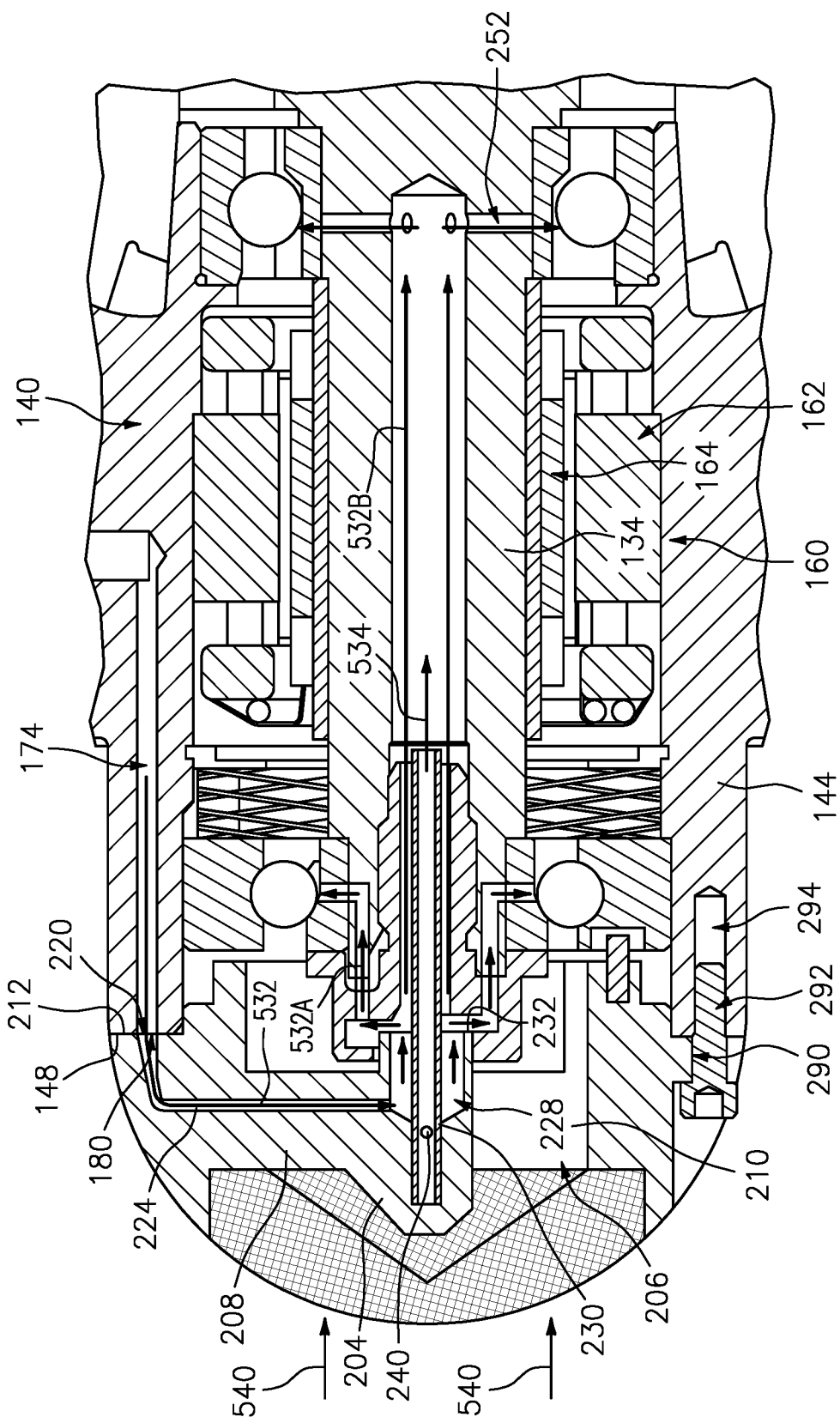
FIG. 2B is a further enlarged view of the forward portion of the engine of FIG. 2.

FIG. 2B further shows a generator 160 including a stator 162 mounted to the inlet member 140 and a rotor 164 mounted to the spool shaft 134. Conventional electrical connections and the like are not shown. FIG. 2A further shows a conduit 170 (e.g., pipe) delivering a fuel flow 530 along a fuel flowpath from a fuel source (e.g., tank and pump not shown) to a plenum 172 in the inlet member 140 (e.g., formed by a combination of casting and drilling followed by plugging access ports). The plenum 172 has a first outlet branch or passageway 174 for feeding a branch flow 532 (FIG. 2B) to the bearings and a second branch 176 for feeding a branch flow 534 (FIG. 3) to the bearings. In the illustrated example, the branch flow 532 further branches into flows 532A and 532B respectively to the forward bearing 130 and the aft bearing 132. The branch flow 534 merges with the branch flow 532B to feed the aft bearing 132. In alternative embodiments, the branch flow 532B or the branch flow 534 may be omitted. Each of the branches or passageways 174 and 176 includes an axial leg extending to an opening (port) 180, 182, respectively, on a forward rim 148 of the inlet member 140. These ports register with ports 220, 222 (FIGS. 2B and 3, respectively) on a body 202 of the nose cap 200.

Figure 3:
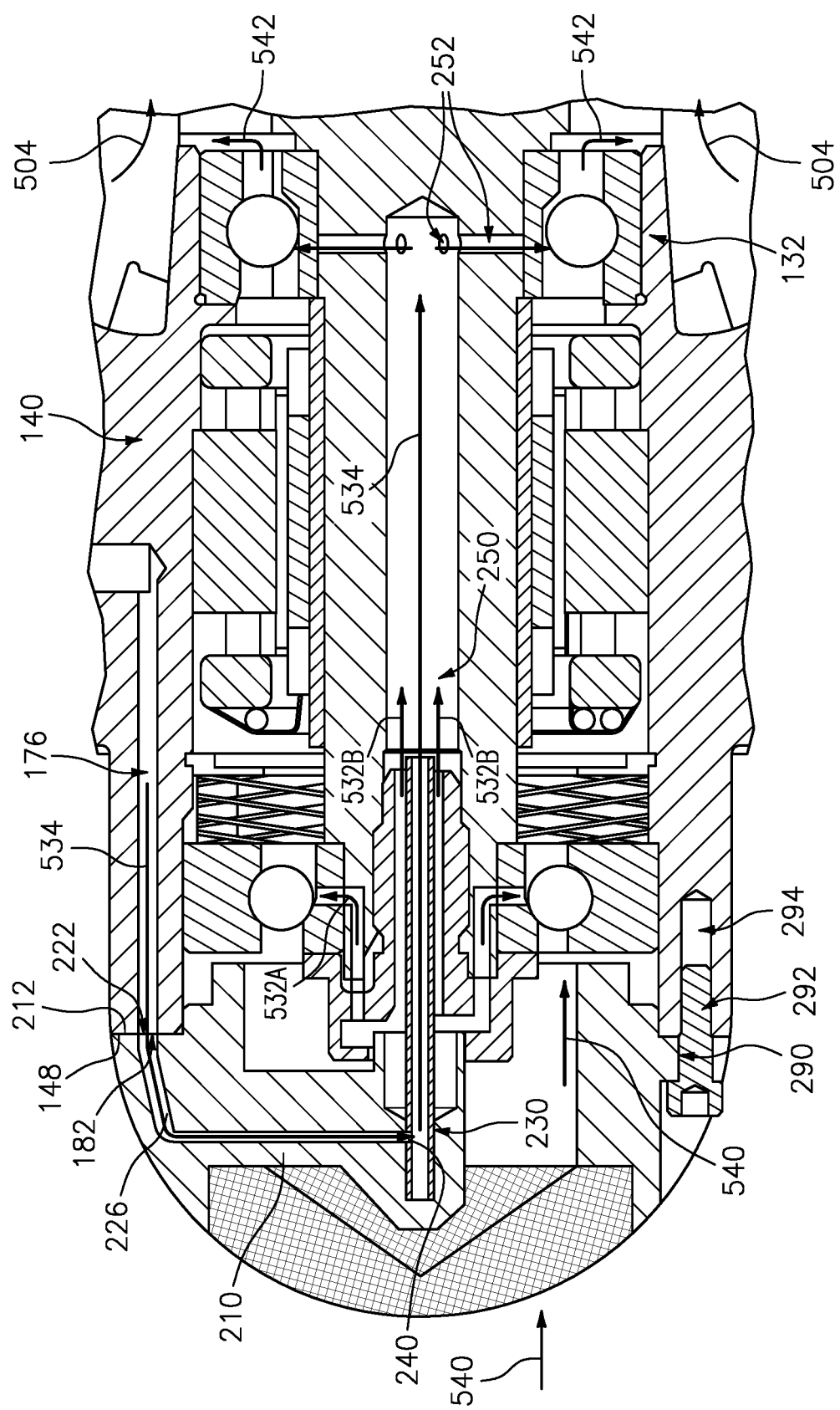
FIG. 3 is an enlarged view of the forward portion taken along line 3-3 of FIG. 1.

The nose cap body 202 includes a centerbody 204 within an axial passageway 206 and a pair of arms 208, 210 (FIG. 2B). FIGS. 2B and 3 show the respective ports 220, 222 in the nose cap body rear face 212 feeding respective passageway legs 224, 226 (respectively continuing passageways 174, 176). The exemplary passageway leg 224 feeds a rearwardly open chamber 228 (FIG. 2B) in the centerbody 204. The chamber 228 has a circular section rendered annular by the presence of a tube 230 (e.g., metallic) mounted (e.g., press-fit) to the centerbody 204 and discussed further below.

The front bearing flow 532 passes out the annular opening of the chamber 228 at an aft rim 232 thereof. It then proceeds through conventional feed passageways to the front bearing 130.

The tube 230 has a lateral inlet port 240 open to a downstream end of the passageway leg 226 to receive the bearing flow 534. An aft end portion of the tube 230 is nested within a central passageway 250 in the spool shaft 134 forward portion. The passageway 250 has radial outlet passageways 252 for feeding the combined flow 532B and 534 to the rear bearing 132.

FIGS. 2 and 3 further show a cooling air flow 540. The cooling air flow 540 passes through the nose cap (passageway 206), then through the front bearing 130, generator 160, and aft bearing 132 to discharge radially as a fuel-laden air flow 542 merging with the main air flow 504 at the compressor inlet (to subsequently be compressed, receive further fuel, combusted, and expanded).

Whereas the baseline nose cap body of the TJ-150 engine is separately formed from a layered mesh insert, the nose cap 200 (FIG. 4) is formed as a single piece combination of a lattice portion (lattice) 260 and the nose cap body 202 surrounding the lattice portion. The combination is additively manufactured (e.g., via laser powder bed fusion or direct metal laser sintering (DMLS)) of an alloy (e.g., steel or an aluminum-silicon alloy such as AlSi10Mg). The lattice 260 may be manufactured as a three-dimensional (3D) lattice structure (e.g., a bi-triangle lattice). A 3D lattice comprises individual lattice beams 400 (FIG. 4B—also known as legs or struts) extending between junctions 402 (nodes). Each junction may join three or more beams, with adjacent strut ends merging at the junction and the junction being centered at a lattice point (also known as a cell corner or node). An exemplary beam length may be circular (at least away from transitional regions at the beam ends/junctions). An exemplary beam length may be measured from junction center to junction center and include portions of the junction) or beam length may be measured from the junctions or node periphery.

Whereas the baseline layered wire mesh has generally constant thickness, the additive manufacture allows optimization of a varied thickness of the lattice 260 to provide a combination of limited weight, structural integrity, and debris protection.

The exemplary lattice 260 has a domed forward perimeter portion 262 (FIG. 4) (convex in two transverse directions) which may have a curvature following the domed curvature of an outer contour of the nose cap body 202. The lattice 260 also has an aft surface or perimeter portion 266.

Although, in some embodiments, the aft perimeter portion 266 may be flat transverse to the centerline 500, such a configuration may be disadvantageous. It provides a maximum thickness at the centerline which may involve excessive flow resistance/restriction and excessive mass. In addition to the reduced flow from the flow resistance, the flow resistance also imparts axial loads which must be transmitted radially outward to the junction of the lattice and nose cap body. These loads impose mechanical stresses.

Figure 4:
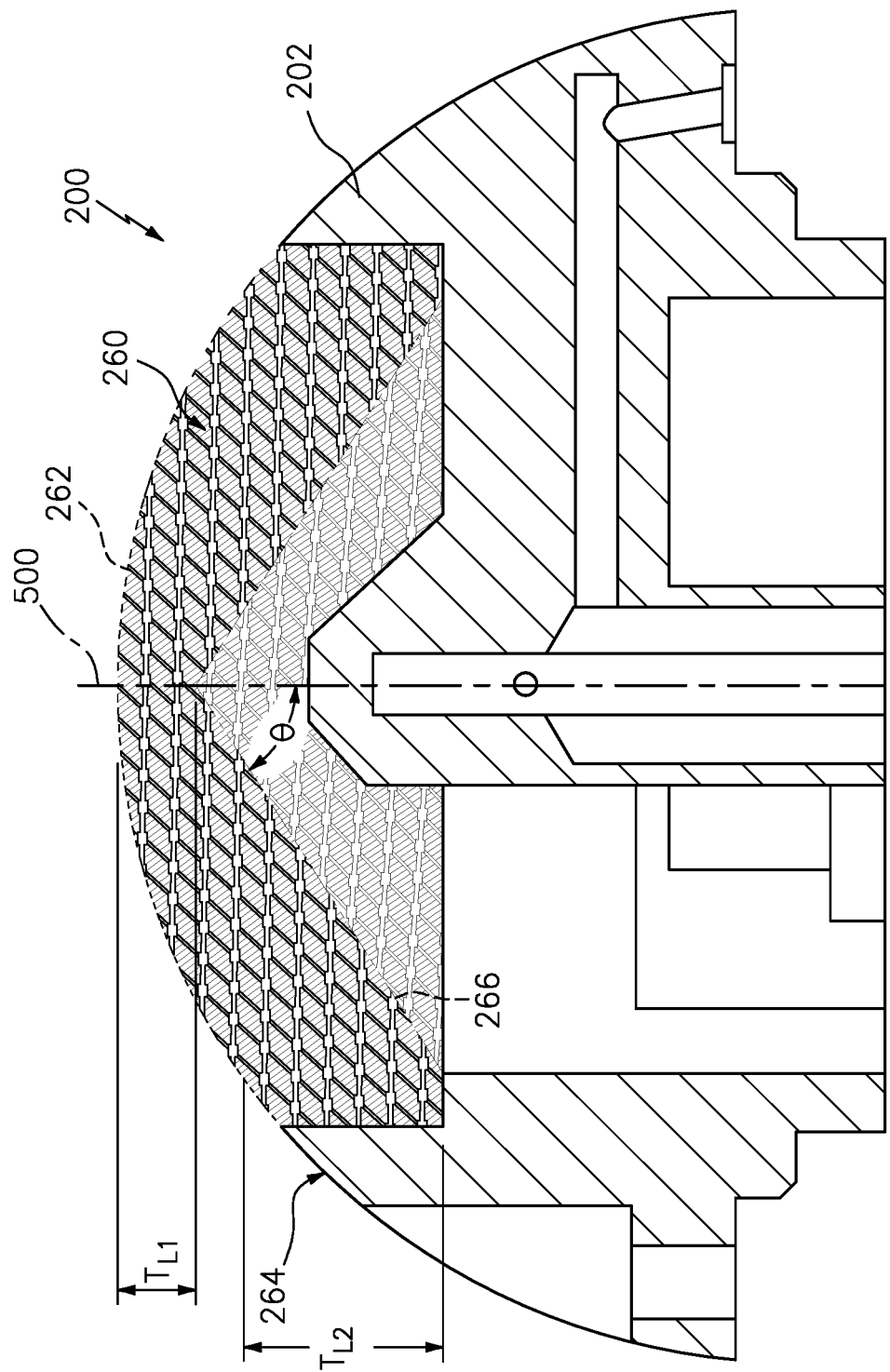
FIG. 4 is a cutaway view of a nose cap.
Figure 4A:
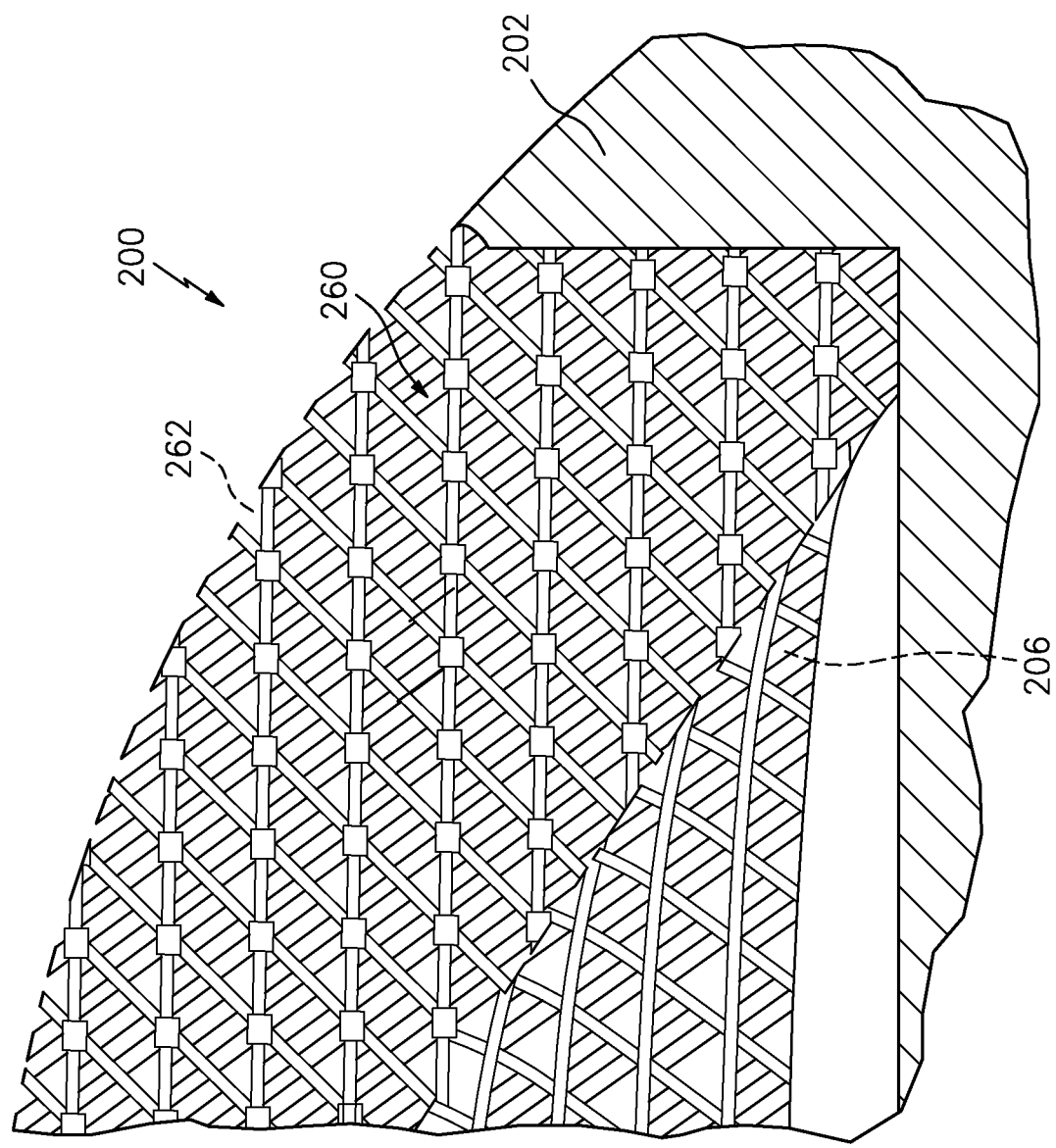
FIGS. 4A and 4B are further enlarged views of the nose cap.
Figure 4B:
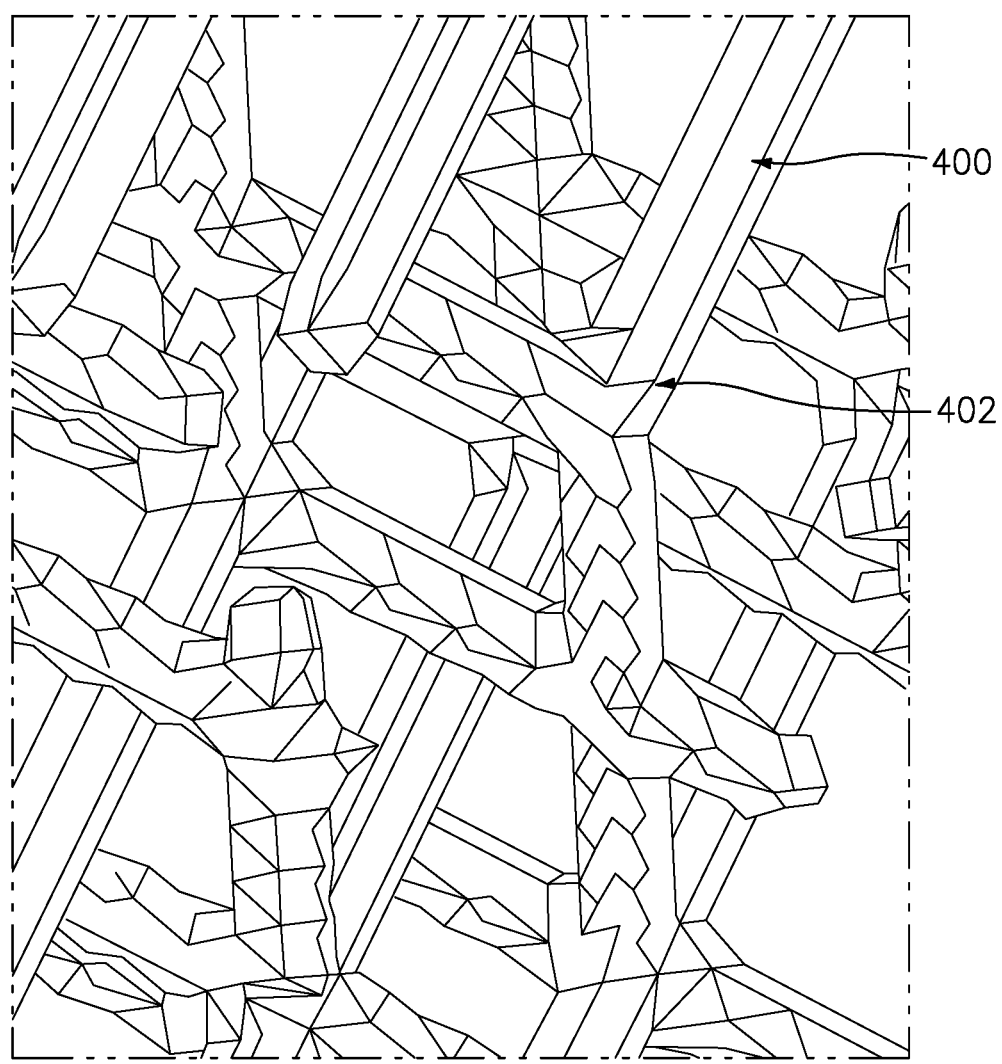

Accordingly, the exemplary configuration has a radially outwardly and rearwardly divergent aft perimeter 266 profile shown as an essentially conical or frustoconical profile (half angle θ shown in FIG. 4). Exemplary θ is about 45°, more generally 40° to 50° or 30° to 60° or 20° to 70°. This configuration may render the lattice 260 relatively thin near the centerline 500, thickening in the radial outward direction. This configuration may provide reduced flow resistance and weight while maintaining structural integrity. An axial span or thickness/depth of the lattice is shown as $T_{L1}$ at the centerline increasing to a maximum value of $T_{L2}$ at the radially inboard extreme of a downstream radial interface between lattice and nose cap body. Exemplary $T_{L1}$ is 3.0 mm, more broadly at least 2.0 mm or 2.0 mm to 10.0 mm. Exemplary $T_{L2}$ is 9.0 mm. In relative terms, exemplary $T_{L1}$ is 75% or less of $T_{L2}$, more particularly, 15% to 75% or 20% to 65% or 25% to 50%.

Exemplary lattice have individual beam cross-sectional transverse linear dimension (may be measured as the maximum cross-section dimension where it reaches a minimum. For example, the maximum of a hexagon is measured between opposite corners. If the hexagon changes size along the beam length, the measurement may be defined as the opposite corner measurement at the position of the smallest hexagonal section. The maximum is a diameter for a circular beam section. Such value may be up to 1.5 mm or 0.05 mm to 1.5 mm, more particularly 0.10 mm to 1.0 mm or 0.20 mm to 0.75 mm. Such exemplary lattice parameters may further have node center to node center beam length of up to 8.0 mm, more particularly 0.3 mm to 5.0 mm or 0.5 mm to 3.0 mm or 0.75 mm to 2.5 mm). Narrower exemplary ratios of said length to said transverse dimension are between 3:1 and 10:1.

The exemplary lattice is a regular lattice (uniform cell structure and relative node position). Thus, the manufacture process may terminate beams along the fore and aft perimeters/peripheries 262 and 266. Alternative irregular lattices may vary cell shape so that beams lay parallel to the perimeter and no beam fragments are free/cantilevered.

FIGS. 2B and 3 further show a circumferential array of axial counterbored mounting holes 290 in the nose cap body 202 receiving threaded fasteners (e.g., screws or bolts 292) extending into associated threaded axial bores 294 open to the forward rim 148 of the inlet member 140.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline screen or engine configuration, details of such baseline may influence details of particular implementations. Accordingly, other embodiments are within the scope of the following claims.

What is claimed is:

1. A turbine engine; comprising:
   a compressor;
   a combustor;
   a turbine;
   a gas flowpath passing consecutively through the compressor, combustor, and turbine; and
   inlet member along the gas flowpath upstream of the compressor and comprising a unitarily-formed single piece combination of:
      a three dimensional (3D) lattice portion; and
      a nose cap body surrounding the lattice portion, wherein
         the lattice portion has a depth along and at an axial centerline of less than 75% of a depth along an axis substantially parallel to the axial centerline and at a location of a radially inboard extreme of a radial interface between the lattice portion and the nose cap body.

2. The turbine engine of claim 1 wherein:
   the inlet member is formed of an aluminum-silicon alloy.

3. The turbine engine of claim 1 wherein:
   the lattice is a regular lattice.

4. The turbine engine of claim 1 wherein:
   the lattice has a beam length measured node center to node center of 0.3 mm to 5.0 mm.

5. The turbine engine of claim 1 wherein:
   the lattice has a beam cross-sectional dimension of 0.05 mm to 1.5 mm.

6. The turbine engine of claim 1 wherein:
   the lattice has a domed forward perimeter portion and a radially outwardly and rearwardly divergent aft perimeter portion.

7. The turbine engine of claim 6 wherein:
   the aft perimeter portion is conical.

8. The turbine engine of claim 1 wherein:
   the lattice portion has an axial depth of at least 2.0 mm.

9. The turbine engine of claim 1 wherein:
   the nose cap body comprises a plurality of mounting holes; and
   a plurality of threaded fasteners mount the nose cap to an inlet housing.

10. The turbine engine of claim 1 wherein:
    the engine is a single-spool engine.

11. The turbine engine of claim 1 wherein:
the compressor is a centrifugal compressor; and
the combustor is a reverse flow combustor.

12. A method for manufacturing the turbine engine of claim 1, the method comprising:
additive manufacture of the inlet member; and
assembling the inlet member to an inlet housing.

13. The method of claim 12 wherein:
the assembling the inlet member to the inlet housing registers passageways of the nose cap body with passageways of the inlet housing.

14. The method of claim 12 wherein:
the additive manufacture comprises laser powder bed fusion.

15. A turbine engine inlet member comprising a unitarily-formed single piece combination of:
a three dimensional (3D) lattice portion; and
a nose cap body surrounding the lattice portion, wherein:
the lattice portion has a depth along and at an axial centerline of less than 75% of a depth along an axis substantially parallel to the axial centerline and at a location of a radially inboard extreme of a radial interface between the lattice portion and the nose cap body.

16. The turbine engine inlet member of claim 15 wherein the three dimensional lattice portion has a domed forward perimeter portion.

17. The turbine engine inlet member of claim 16 wherein the three dimensional lattice portion has a rearwardly divergent aft perimeter portion.

18. The turbine engine inlet member of claim 17 wherein the aft perimeter portion is conical or frustoconical.

19. The turbine engine inlet member of claim 17 wherein:
the depth at the axial centerline is 25% to 50% of the depth at the location.

20. A turbine engine inlet member comprising a unitarily-formed single piece combination of:
a three dimensional (3D) lattice portion; and
a nose cap body surrounding the lattice portion,
wherein:
the three dimensional lattice portion has a domed forward perimeter portion and a rearwardly divergent aft perimeter portion; and
the aft perimeter portion is conical or frustoconical.

21. The turbine engine inlet member of claim 20 wherein:
the single piece combination is an aluminum-silicon alloy.

* * * * *